(12) United States Patent
Byun et al.

(10) Patent No.: US 12,516,150 B2
(45) Date of Patent: Jan. 6, 2026

(54) ORGANIC SOLVENT-SOLUBLE COPOLYMER POLYESTER, COMPOSITION FOR FORMING ULTRAFILTRATION MEMBRANE COMPRISING SAME, AND HIGH WATER PERMEABILITY REVERSE OSMOSIS MEMBRANE PREPARED THEREFROM

(71) Applicant: TORAY ADVANCED MATERIALS KOREA INC., Gyeongsangbuk-do (KR)

(72) Inventors: Gwang Su Byun, Gyeongsangbuk-do (KR); Jae Won Lim, Gyeongsangbuk-do (KR); Jeong Hwan Lee, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 752 days.

(21) Appl. No.: 17/797,137

(22) PCT Filed: Apr. 2, 2021

(86) PCT No.: PCT/KR2021/004104
§ 371 (c)(1),
(2) Date: Aug. 3, 2022

(87) PCT Pub. No.: WO2021/246629
PCT Pub. Date: Dec. 9, 2021

(65) Prior Publication Data
US 2023/0105592 A1 Apr. 6, 2023

(30) Foreign Application Priority Data
Jun. 1, 2020 (KR) .................. 10-2020-0065953

(51) Int. Cl.
*B01D 61/02* (2006.01)
*B01D 61/14* (2006.01)
*B01D 69/02* (2006.01)
*B01D 69/10* (2006.01)
*B01D 71/48* (2006.01)
*B01D 71/56* (2006.01)
*C08G 63/183* (2006.01)

(52) U.S. Cl.
CPC ......... *C08G 63/183* (2013.01); *B01D 61/025* (2013.01); *B01D 61/145* (2013.01); *B01D 69/02* (2013.01); *B01D 69/106* (2022.08); *B01D 69/1071* (2022.08); *B01D 71/48* (2013.01); *B01D 71/56* (2013.01); *B01D 2325/022* (2013.01); *B01D 2325/02834* (2022.08); *B01D 2325/20* (2013.01)

(58) Field of Classification Search
CPC ....... B01D 69/02; B01D 71/48; C08G 63/183
See application file for complete search history.

(56) References Cited

U.S. PATENT DOCUMENTS

2019/0309161 A1   10/2019   Oh et al.

FOREIGN PATENT DOCUMENTS

| JP | 61 283304 | 12/1986 |
|---|---|---|
| JP | 02-158620 | 6/1990 |
| JP | H05329347 A | * 12/1993 |
| JP | 07 081247 | 3/1995 |
| JP | 2648191 | 8/1997 |
| JP | H 11 080334 | 3/1999 |
| JP | 2019-070205 | 5/2019 |
| KR | 10-2010-0136809 | 12/2010 |
| KR | 10-2015-0079213 | 7/2015 |
| KR | 10-1771171 | 8/2017 |
| KR | 10-2020-0021727 | 3/2020 |
| WO | WO 2015/046250 | 4/2015 |

OTHER PUBLICATIONS

Lee et al—KR 20150079213 A FIT translation—Jul. 8, 2015 (Year: 2015).*
Aoki, Takao—JP H5-329347 FIT Translation—Dec. 14, 1993 (Year: 1993).*
Notice of Reasons for Refusal dated Aug. 1, 2023, in Japanese Patent Application No. 2022-547302 (with English translation).
Chinese Office Action dated Jun. 30, 2023, in corresponding Chinese Patent Application No. 202180033295.0.

* cited by examiner

*Primary Examiner* — Bradley R Spies
(74) *Attorney, Agent, or Firm* — Haynes and Boone, LLP

(57) ABSTRACT

The present invention relates to an organic solvent-soluble copolymerized polyester, a composition for forming an ultrafiltration membrane including the same, and a high water-permeability reverse osmosis membrane prepared therefrom. More specifically, the present invention relates to a polyester that has a high solubility in organic solvents at room temperature and thus can be used to produce ultrafiltration membranes at low cost, a composition for forming an ultrafiltration membrane including the same, and a high water-permeability reverse osmosis membrane prepared therefrom, wherein the reverse osmosis membrane has a reduced production cost and high water permeability.

10 Claims, 1 Drawing Sheet

[FIG. 1]
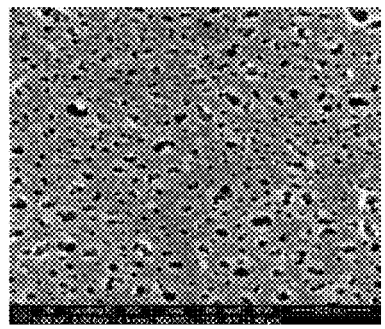
[FIG. 2]
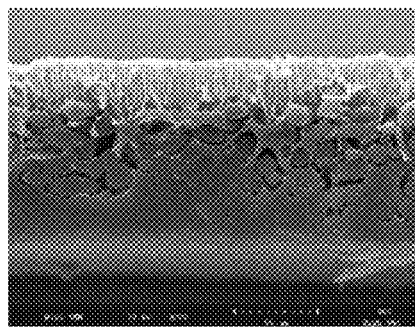
[FIG. 3]
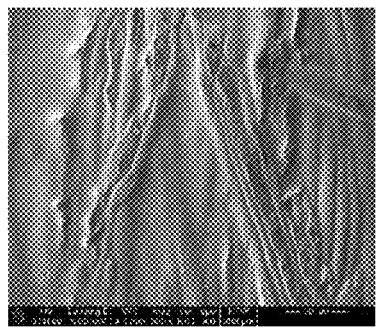

ORGANIC SOLVENT-SOLUBLE COPOLYMER POLYESTER, COMPOSITION FOR FORMING ULTRAFILTRATION MEMBRANE COMPRISING SAME, AND HIGH WATER PERMEABILITY REVERSE OSMOSIS MEMBRANE PREPARED THEREFROM

The present application is a National Stage (371) of PCT/KR2021/004104, filed Feb. 4, 2021, which claims priority to KR 10-2020-0065953, filed Jan. 6, 2020, the entire contents of these applications in incorporated herein by reference.

TECHNICAL FIELD

The present invention relates to an organic solvent-soluble copolymerized polyester, a composition for forming an ultrafiltration membrane including the same, and a high water-permeability reverse osmosis membrane prepared therefrom. More specifically, the present invention relates to a polyester that has a high solubility in organic solvents at room temperature and thus can be used to produce ultrafiltration membranes at low cost, a composition for forming an ultrafiltration membrane including the same, and a high water-permeability reverse osmosis membrane prepared therefrom, wherein the reverse osmosis membrane has a reduced production cost and high water permeability.

BACKGROUND ART

Conventional ultrafiltration membranes for water treatment were prepared by using hydrophobic polymers such as polysulfone (PSl) and polyether sulfone (PES). Polyester is generally used as a material for films, coatings and injection moldings, but a water treatment membrane prepared by using polyester has not been reported so far. However, there is a specific type of membrane such as a track-etched membrane having a uniform and narrow pore distribution by exposing a dense polyester film without pores to ionizing radiation (thermal neutron). This separation membrane is used to separate microorganisms by allowing the microorganisms to remain on the membrane surface and passing solvents and low-molecular-weight substances. In other words, there has been no case of preparing and commercializing a porous membrane through the phase separation method by using polyester until recently.

On the other hand, there have been many reports of cases using a nonwoven fabric made from polyester fibers as a separation membrane. In PCT Publication No. WO2015/046250, saturated polyester and a hydrophilic polyethylene glycol (meth)acrylate block copolymer were applied to the surface of a nonwoven fabric to increase the cleaning effect, and in addition, a sulfonic group, a carboxyl group, a hydroxyl group and the like are possible as hydrophilic functional groups. In this case, a block copolymer, not a copolymer, was used, and properties that are different from those of the random copolymer were used in the polymer properties and microstructure.

In the case of an ultrafiltration membrane prepared by using commercial polyester, particularly, polyethylene terephthalate, the solubility in polar aprotic organic solvents at room temperature is low due to the semi-crystalline nature and high polymer polarity of polyethylene terephthalate, and thus, when forming the composition for forming an ultrafiltration membrane, the temperature must be raised to a temperature (60° C.) much higher than room temperature, and a large temperature difference with the coagulation bath was inevitable for phase separation. In other words, there have been problems in that it is difficult to optimize the membrane-forming performance under various temperature conditions, and maintaining a high temperature for the rude liquid requires high energy consumption in terms of the process.

DISCLOSURE

Technical Problem

The present invention has been devised to solve the above-described problems, and the first problem to be solved in the present invention is to provide a copolymerized polyester, which is capable of forming an ultrafiltration membrane at low cost due to excellent solubility in organic solvents at room temperature.

In addition, the second problem to be solved in the present invention is to provide a composition for forming an ultrafiltration membrane, which is capable of producing a polyester ultrafiltration membrane having a high water permeability by using the copolymerized polyester.

In addition, the third problem to be solved in the present invention is to provide a reverse osmosis membrane having excellent water permeability while having strong resistance to membrane contamination in raw water by using polyester.

Technical Solution

In order to solve the above-described first problem, the copolymerized polyester of the present invention is formed by an esterification reaction between an acid component including at least one of $C_{8-12}$ aromatic dicarboxylic acid; and a diol component including at least one of $C_{2-10}$ linear or branched aliphatic polyhydric alcohol.

In a preferred exemplary embodiment of the present invention, the molar ratio ($N_C/N_O$) of the number of carbon atoms ($N_C$) and the number of oxygen atoms ($N_O$) may be 2.7 to 6.

In a preferred exemplary embodiment of the present invention, the solubility in dimethylformamide (DMF) at room temperature may be 20% by weight or more.

In a preferred exemplary embodiment of the present invention, the acid component may include terephthalic acid and a $C_{8-12}$ aromatic dicarboxylic acid compound other than terephthalic acid.

In a preferred exemplary embodiment of the present invention, the $C_{8-12}$ aromatic dicarboxylic acid compound other than terephthalic acid may be at least one compound selected from isophthalic acid (IPA), naphthalendioic acid and a 5-sulfoisophthalic acid (SIA) sodium salt.

In a preferred exemplary embodiment of the present invention, the acid component may include 5 to 50 mol % of the $C_{8-12}$ aromatic dicarboxylic acid compound other than terephthalic acid based on the total amount of the acid component.

In a preferred exemplary embodiment of the present invention, the $C_{2-10}$ linear or branched aliphatic polyhydric alcohol may include at least one polyhydric alcohol selected from ethylene glycol (EG) and $C_{5-10}$ linear or branched aliphatic polyhydric alcohol.

In a preferred exemplary embodiment of the present invention, the diol component may include 35 to 65 mol % of ethylene glycol based on the total amount of the diol component.

Meanwhile, the composition for forming an ultrafiltration membrane according to the present invention may include the copolymerized polyester of the present invention and an organic solvent.

In a preferred exemplary embodiment of the present invention, the composition for forming an ultrafiltration membrane according to the present invention may have a viscosity of 10 to 600 cP.

In a preferred exemplary embodiment of the present invention, the organic solvent may be a mixed solution of one or two or more selected from diethylene glycol, triethylene glycol, methyl ethyl ketone, ethylene glycol diacetate, ethylene glycol dimethylether, toluene, dimethylformamide, dimethylacetamide (DMAc), N-methyl-2-pyrrolidone (NMP), dimethyl sulfoxide (DMSO), m-cresol, diglycolamine and tetrahydrofuran (THF).

In a preferred exemplary embodiment of the present invention, the composition for forming an ultrafiltration membrane may include the copolymerized polyester at a concentration of 10 to 30% by weight.

Furthermore, the reverse osmosis membrane of the present invention may include a porous support layer and an ultrafiltration membrane formed on one surface of the porous support layer, and including the copolymerized polyester of the present invention.

In a preferred exemplary embodiment of the present invention, the reverse osmosis membrane of the present invention may have a water permeability of 200 to 1,000 gfd as measured according to the measurement conditions below.

Measurement Conditions

The reverse osmosis membrane is operated at a temperature of 25° C. and a pressure of 1 kgf/cm$^2$ by using raw water, which is deionized water (DI), to measure the water permeability.

In a preferred exemplary embodiment of the present invention, the ultrafiltration membrane may have an asymmetric structure in which the average pore size gradually increases or decreases from a surface (lower surface) in contact with e porous support layer the opposite surface (upper surface).

In a preferred exemplary embodiment of the present invention, the average pore size ($D_{50}$) on upper surface of the ultrafiltration membrane may be 0.01 to 0.2 μm.

Advantageous Effects

Unlike the conventional copolymerized polyester, the copolymerized polyester according to the present invention has the advantage in that it has excellent solubility in organic solvents even at room temperature such that energy consumption can be significantly reduced when preparing the composition for forming an ultrafiltration membrane.

In addition, the reverse osmosis membrane including an ultrafiltration membrane prepared by using the composition for forming an ultrafiltration membrane according to the present invention has the advantages of excellent resistance to membrane contamination and excellent water permeability, compared to a reverse osmosis membrane using an ultrafiltration membrane containing the conventional polysulfone or polyethersulfone-based polymer. In addition, due to the high polarity of the polyester ultrafiltration membrane, the adhesion between the nonwoven fabric and the polyamide (PA) layer is excellent, and thus, the mechanical durability of the reverse osmosis membrane is also excellent.

DESCRIPTION OF DRAWINGS

FIG. 1 is an SEM image obtained by photographing a microstructure including pores of the ultrafiltration membrane according to a preferred exemplary embodiment of the present invention.

FIG. 2 is an SEM image obtained by photographing the layered structure of the reverse osmosis membrane according to a preferred exemplary embodiment of the present invention.

FIG. 3 is an SEM image obtained by photographing the reverse osmosis membrane according to a preferred exemplary embodiment of the present invention.

MODES OF THE INVENTION

Hereinafter, the present invention will be described in more detail with reference to the accompanying drawings.

As described above, the conventional ultrafiltration membrane including a polysulfone (PSf) or polyethersulfone (PES)-based polymer has a low affinity for water due to the hydrophobicity of the polymer, and thus, the water permeability is significantly low when manufactured as a separation membrane. In addition, during raw water filtration, various hydrophobic suspended organic substances contained in raw water were easily adsorbed on the surface of the separation membrane, causing membrane contamination, and lowering water permeability and performance of the separation membrane.

Further, in the case of manufacturing an ultrafiltration membrane by using a polyester polymer, conversely, the solubility in organic solvents is low due to the hydrophilicity of polyester, and thus, a high temperature must be maintained when preparing a polymer composition for forming an ultrafiltration membrane, and as a result, there was a disadvantage in that a lot of manufacturing costs were involved.

Accordingly, in order to solve the above-described first problem, the present invention sought to solve this problem by providing a copolymerized polyester, which is formed by an esterification reaction between an acid component including at least one of $C_{8-12}$ aromatic dicarboxylic acid; and a diol component including at least one of $C_{2-10}$ linear or branched aliphatic polyhydric alcohol, wherein the molar ratio ($N_C/N_O$) of the number of carbon atoms ($N_C$) and the number of oxygen atoms ($N_O$) is 2.7 to 6, and the solubility in dimethylformamide (DMF) at room temperature is 20% by weight or more.

The copolymerized polyester according to the present invention has the advantage of excellent solubility in organic solvents at room temperature such that the reaction can be performed at room temperature without heating when preparing the composition for forming an ultrafiltration membrane.

Preferably, the copolymerized polyester according to the present invention may have a solubility of 20% by weight or more in dimethylformamide at room temperature, and preferably, 24% by weight or more. More preferably, the solubility in dimethylformamide at room temperature may be 26% by weight to 50% by weight. If the solubility of the copolymerized polyester in dimethylformamide at room temperature is less than 20% by weight, it is not easy to control the concentration and viscosity of the composition, and thus, it is not easy to control the physical properties according to the purpose of the ultrafiltration membrane to be prepared.

Dimethylformamide is a polar aprotic solvent, and the copolymerized polyester according to the present invention adjusts the molar ratio of the number of carbon atoms and the number of oxygen atoms to a suitable range by adjusting the type and content of the monomer so as to control the polarity of the polyester polymer to improve solubility.

The copolymerized polyester according to the present invention has excellent solubility at room temperature in not only dimethylformamide but also other types of polar aprotic organic solvents, and thus has the advantage of easy phase separation at room temperature.

As used here, the term 'room temperature' means a temperature of 15° C. to 25° C., and the meaning that the solubility at room temperature is A or more means that the solubility is A or more in the entire range of 15 to 25° C.

Hereinafter, the copolymerized polyester of the present invention will be described for each composition.

First, the copolymerized polyester according to the present invention is formed by an esterification polymerization reaction between an acid component including at least one of $C_{8-12}$ aromatic dicarboxylic acid; and a diol component including at least one of $C_{2-10}$ linear or branched aliphatic polyhydric alcohol.

Preferably, the acid component may further include at least one dicarboxylic acid compound selected from $C_{6-12}$ aliphatic dicarboxylic acid compounds in addition to the $C_{8-12}$ aromatic dicarboxylic acid compound, but is not necessarily limited to this compound.

In addition, the $C_{8-12}$ aromatic dicarboxylic acid compound may include at least one aromatic dicarboxylic acid compound selected from terephthalic acid and a $C_{8-12}$ aromatic dicarboxylic acid compound other than terephthalic acid. In this case, the $C_{8-12}$ aromatic dicarboxylic acid compound other than terephthalic acid may preferably be at least one compound selected from isophthalic acid (IPA), naphthalendioic acid and a 5-sulfoisophthalic acid (SIA) sodium salt, but is not necessarily limited thereto.

In addition, the $C_{6-14}$ aliphatic dicarboxylic acid may be at least one compound selected from adipic acid (AA), dodecanedioic acid and tetradecanedioic acid. However, the present invention is not necessarily limited thereto.

The acid component may preferably include terephthalic acid and $C_{8-12}$ aromatic dicarboxylic acid other than terephthalic acid. In this case, the $C_{8-12}$ aromatic dicarboxylic acid other than terephthalic acid may be included in an amount of 5 to 50 mol %, preferably, 15 to 45 mol %, and more preferably 25 to 35 mol %, based on the total amount of the acid component. If the content of the $C_{8-12}$ aromatic dicarboxylic acid other than terephthalic acid is less than 5 mol %, there may be a problem in that the solubility in an organic solvent is lowered, and if it is more than 50 mol %, the glass transition temperature ($T_g$) of the polymerized copolymerized polyester may be excessively low, which may cause a problem of deterioration in heat resistance.

More specifically, the acid component may include 50 to 95 mol % of terephthalic acid, preferably, 55 to 85 mol %, and more preferably, 65 to 75 mol %, based on the total amount of the acid component, and it may include 5 to 50 mol % of the $C_{8-12}$ aromatic dicarboxylic acid, preferably, 15 to 45 mol %, and more preferably, 25 to 35 mole %.

Meanwhile, the $C_{8-12}$ aromatic dicarboxylic acid other than terephthalic acid may be isophthalic acid. As such, when isophthalic acid is used as the $C_{8-12}$ aromatic dicarboxylic acid other than terephthalic acid, compared to terephthalic acid and isophthalic acid, the polarity of the synthesized polyester may be controlled by adjusting the content of isophthalic acid, because isophthalic acid, whose sum of dipole moments does not become 0, is more polar than terephthalic acid, in which the dipole moment is 0 due to the symmetry of the molecules, and since isophthalic acid has a kinked structure of the main chain of the polymer, it may serve to increase solubility by forming a free volume between the polymer main chains.

In addition, the acid component may further include a $C_{6-14}$ aliphatic dicarboxylic acid compound, and it may include the $C_{6-14}$ aliphatic dicarboxylic acid in an amount of 1 to 10 mol % based on the total amount of the acid component.

The $C_{2-10}$ linear or branched aliphatic polyhydric alcohol may include at least one polyhydric alcohol selected from ethylene glycol (EG) and $C_{5-10}$ linear or branched aliphatic polyhydric alcohol. In this case, the polyhydric alcohol means a dihydric alcohol, that is, a diol.

Preferably, the diol component includes ethylene glycol, and may further include at least one aliphatic polyhydric alcohol selected from $C_{5-10}$ linear or branched aliphatic polyhydric alcohols. Through this, it is possible to control the molar ratio between the number of carbon atoms and the number of oxygen atoms in the copolymerized polyester.

In addition, preferably, the diol component may further include $C_{1,000}$ or less polyethylene glycol (PEG).

In addition, the $C_{5-10}$ linear or branched aliphatic polyhydric alcohol may be neopentyl glycol or butyl ethyl propanediol. However, the present invention is not necessarily limited thereto. The butyl ethyl propanediol may preferably include 2-butyl-2-ethyl-1,3-propandiol (BEPD).

Preferably, the diol component may include ethylene glycol and neopentyl glycol, or ethylene glycol and BEPD. However, the present invention is not necessarily limited thereto.

In addition, the content of ethylene glycol in the diol component may be 35 to 65 mol %, preferably, 40 to 60 mol %, and more preferably, 45 to 55 mol %, based on the total amount of the diol component.

If the content of ethylene glycol in the diol component is less than 35 mol % based on the total amount of the diol component, the hydrophilicity of the synthesized copolymerized polyester becomes too low such that the solubility in organic solvents at room temperature may be lowered. Conversely, if the content of ethylene glycol in the diol component is 65 mol % based on the total amount of the diol component, the glass transition temperature is too low, which may cause a problem in that the heat resistance of the ultrafiltration membrane is lowered.

The copolymerized polyester according to the invention may have a molar ratio ($N_C/N_O$) of the number of carbon atoms ($N_C$) and the oxygen atom number ($N_O$) of 2.7 to 6.0, preferably, 2.7 to 5.0, more preferably, 2.8 to 3.2, and even more preferably, 2.8 to 3.1.

When it has an $N_C/N_O$ value within the above range, it is possible to have excellent levels of hydrophilicity and solubility in polar aprotic organic solvents such that when formed as an ultrafiltration membrane on a membrane such as a reverse osmosis membrane, both of adhesion to a porous support and adhesion to a polyamide (PA) coating layer are excellent so as to have excellent mechanical durability, and it is possible to perform the phase separation reaction at room temperature without the need to perform the phase separation reaction at high temperature when preparing the composition for forming an ultrafiltration membrane, and thus, there is an advantage in that the manufacturing cost may be greatly reduced.

Herein, $N_C/N_O$ represents an average value for the entire polyester resin, not a value for one molecule of polyester, and the measurement method calculated the number of carbon atoms ($N_C$) and the number of oxygen atoms ($N_O$) per unit by polymerizing at a set molar ratio of the comonomer used during polyester polymerization and obtaining the molar ratio of the synthesized polymer participating in the actual polymerization of each monomer through FT-NMR.

If $N_C/N_O$ is less than 2.7, there is a problem in that the phase separation reaction of the ultrafiltration membrane may not be performed at room temperature because it is not well dissolved in the polar aprotic organic solvent. This results in an increase in manufacturing costs and a decrease in productivity. In addition, if $N_C/N_O$ is more than 6.0, the polarity of the polyester is too small, and thus, there are disadvantages in that the affinity for water is lowered, water permeability is reduced, and the membrane contamination resistance to organic contaminants is reduced.

Another aspect of the present invention provides a composition for forming an ultrafiltration membrane, including the above-described copolymerized polyester synthesized by an esterification reaction and a condensation polymerization reaction of the acid component and the diol component; and an organic solvent, wherein the viscosity is 10 to 600 cP.

The composition for forming an ultrafiltration film may be in the form of a solution in which the copolymerized polyester is preferably dissolved in an organic solvent.

The composition for forming an ultrafiltration membrane according to the present invention is obtained by dissolving the copolymerized polyester in an organic solvent at room temperature, and thus, the ultrafiltration membrane phase separation reaction is possible at low cost.

In addition, the composition for forming an ultrafiltration membrane has a viscosity of 10 to 600 cP, and when it is within this range, it is possible to manufacture an ultrafiltration membrane having the best water permeability, and the contamination on the membrane is also the best. Preferably, the viscosity of the composition may be 30 to 500 cP, preferably, 35 to 450 cP, more preferably, 35 to 400 cP, and even more preferably, 35 to 100 cP.

If the viscosity is less than 10 cP, the composition viscosity is low, and it penetrates the nonwoven fabric as a support such that a porous layer is not formed on the nonwoven fabric. Conversely, if the viscosity is more than 600 cP, it is difficult to form the thickness of the membrane below a certain level, which makes it difficult to form pores as a result, and the water permeability is lowered, making it impossible to realize the characteristics of the ultrafiltration membrane.

The organic solvent is preferably a polar aprotic organic solvent, and for example, it may be a mixed solution of one or two or more of diethylene glycol, triethylene glycol, methyl ethyl ketone, ethylene glycol diacetate, ethylene glycol dimethylether, toluene, dimethylformamide, dimethylacetamide (DMAc), N-methyl-2-pyrrolidone (NMP), dimethyl sulfoxide (DMSO), m-cresol, diglycolamine and tetrahydrofuran (THF). However, the organic solvent is not necessarily limited thereto.

Preferably, the composition for forming an ultrafiltration membrane may include the copolymerized polyester in a concentration of 10 to 20% by weight, preferably, 11 to 19% by weight, more preferably, 12 to 17% by weight, and even more preferably, 13 to 15% by weight. If the concentration is less than 10% by weight, there is a concern that the viscosity of the composition is excessively high. Conversely, if the concentration is more than 20% by weight, there is a concern that the viscosity of the composition is excessively low. The problem in this case is the same as described for the critical significance of the viscosity range of each composition.

Another aspect of the present invention provides a reverse osmosis membrane, including an ultrafiltration membrane including the above-described copolymerized polyester.

Specifically, the reverse osmosis membrane of the present invention includes a porous support layer; and an ultrafiltration membrane formed on one surface of the porous support layer and including the above-described copolymerized polyester.

Preferably, the reverse osmosis membrane according to the present invention may further include a polyamide coating layer on the ultrafiltration membrane.

The reverse osmosis membrane according to the present invention includes an ultrafiltration membrane including the above-described copolymerized polyester such that adhesion to a porous support and adhesion to the polyamide coating layer are more excellent than those of the conventional polysulfone or polyethersulfone-based ultrafiltration membrane, and thus, the mechanical durability is remarkably excellent.

The porous support may be preferably a woven fabric or a nonwoven fabric.

The woven or nonwoven fabric may preferably be made from polyester fibers. When the woven fabric or nonwoven fabric is made from polyester fibers, adhesion to the ultrafiltration membrane including the copolymerized polyester according to the present invention may be more excellent, and thus, the mechanical durability of the reverse osmosis membrane under operating conditions may be improved.

In addition, the reverse osmosis membrane according to the present invention may have a water permeability of 200 to 1,000 gfd as measured according to the measurement conditions below.

Measurement Conditions

The reverse osmosis membrane is operated at a temperature of 25° C. and a pressure of 1 kgf/cm$^2$ by using raw water, which is deionized water (DI), to measure the water permeability.

The reverse osmosis membrane according to the present invention may have more excellent water permeability by using the above-described copolymerized polyester as an ultrafiltration membrane in place of the conventional polysulfone-based or polyethersulfone-based polymer. If the water permeability is less than 200 gfd, the pressure resistance to the operating conditions of the reverse osmosis membrane may be weakened, and if it is more than 1,000 gfd, the salt removal rate may be lowered.

The ultrafiltration membrane may preferably have a thickness of 120 to 200 µm. If the thickness of the ultrafiltration membrane is less than 120 µm, the pressure resistance and/or contamination resistance of the membrane may be reduced, and if it is more than 200 µm, the water permeability of the membrane may be reduced.

The ultrafiltration membrane has a lower surface in contact with the porous support and an upper surface that is opposite thereto, based on the cross-section of the membrane, and it may have an asymmetric cross-sectional structure in which the average pore size gradually increases or decreases from the lower surface to the upper surface.

In addition, the average pore size ($D_{50}$) on the upper surface of the ultrafiltration membrane may be 0.01 to 0.2 μm. Preferably, it may be 0.025 to 0.075 μm, more preferably, 0.025 to 0.055 μm, even more preferably, 0.025 to 0.045 μm, and most preferably, 0.025 to 0.033 μm. If the average pore size ($D_{50}$) on the upper surface is less than 0.01 μm, the water permeability of the reverse osmosis membrane may be reduced, and if it is more than 0.2 μm, the removal rate of the separation membrane is lowered, making it difficult to achieve the objects of the present invention.

Next, the method for manufacturing a reverse osmosis membrane according to the present invention will be described.

The reverse osmosis membrane according to the present invention may be manufactured according to the general manufacturing methods of a reverse osmosis membrane and an ultrafiltration membrane, and these may be manufactured according to a method well known to those skilled in the art.

Specifically, it may be manufactured by including the steps of (1) preparing a copolymerized polyester resin through an esterification reaction and a condensation polymerization reaction of an acid component and a diol component; (2) preparing a composition for forming an ultrafiltration membrane by mixing the copolymerized polyester resin with an organic solvent at a predetermined temperature; (3) treating the polymer solution on a porous support; and (4) performing an induced phase transition step of precipitating the composition for forming an ultrafiltration membrane treated on the porous support in a non-solvent at a predetermined temperature.

In step (1), the type of the monomer of the acid component and the diol component, and the composition ratio between each component used for copolymerization are the same as described above, and thus, the description thereof is omitted, and the reaction ratio between the acid component and the diol component may be appropriately selected by a person skilled in the art in order to obtain the desired physical properties of the polyester within the range of the general content ratio used for the production of polyester in the art.

The concentrations of the organic solvent and the copolymerized polyester used in step (2) may be adjusted by a person skilled in the art in order to obtain desired physical properties within the range as described above. According to the present invention, since it has high solubility at room temperature without heating to dissolve the copolymerized polyester in the organic solvent in step (2), it is possible to reduce the manufacturing cost.

The method of treating on the porous support in step (3) is to apply the composition for forming an ultrafiltration membrane on the porous support by using a method known in the art, and for example, it may be performed by any one method selected from dipping, spraying, drop casting, self-assembly, spin coating, doctor blade, bar coating, slot die coating, microgravure coating, coma coating and printing and casting method, and preferably, by the casting method.

In step (4), the non-solvent is phase-changed with the organic solvent included in the composition for forming an ultrafiltration membrane so as to form pores in the copolymerized polyester ultrafiltration membrane, and the non-solvent may include at least one selected from water, alcohols and glycols The method of performing the induced phase transition step is the same as the general method for manufacturing an ultrafiltration membrane, and a person skilled in the art may change the phase transition conditions to suit the purpose of the invention.

Hereinafter, the present invention will be described in more detail with reference to specific examples. The following examples are not meant to limit the scope of the present invention, but are merely specific examples to help the understanding of the present invention. A person skilled in the art will be able to easily practice by adding, deleting and changing components within the scope of the present invention according to the purpose of the invention.

Preparation Example 1: Preparation of Copolymerized Polyester Resin (1) An acid component having a composition of 70 mol % terephthalic acid (TPA) and 30 mol % isophthalic acid (IPA) and a diol component having a composition of 50 mol % ethylene glycol (EG) and 50 mol % neopentyl glycol (NPG) were introduced into a reactor at a molar ratio of 1:1.5 to prepare an ester reaction product The ester reaction product was obtained by esterification reaction at 255° C. under a pressure of 1,140 Torr. Afterwards, the ester reaction product was transferred to a polycondensation reactor, and 350 ppm of a titanium citric acid-based polymerization catalyst and 150 ppm of triethyl phosphate as a heat stabilizer were added to prepare a polycondensation reaction. The polycondensation reaction product was heated to 280° C. while gradually reducing the pressure such that the final pressure was 0.5 Torr to carry out a polycondensation reaction to prepare an organic solvent-soluble copolymerized polyester resin in the form of chips.

Preparation Examples 2 to 10: Preparation of Copolymerized Polyester Resin

Organic solvent-soluble copolymerized polyester resins were prepared in the same manner as in Preparation Example 1, except that the type and content of each monomer were changed as shown in Table 1 below.

Comparative Preparation Example 1: Polysulfone-Based Polymer Resin

Solvay's Udel P-3500, which is a commercially available polysulfone-based polymer (PSf), was prepared.

Comparative Preparation Example 2: Polyethylene Terephthalate Resin

Toray's FHH22130, which is a commercially available PET polymer, was prepared.

TABLE 1

| Classification | Acid Component (mol %) | | | Diol Component (mol %) | | |
|---|---|---|---|---|---|---|
| | TPA | IPA | DA | EG | NPG | BEPD |
| Preparation Example 1 | 70 | 30 | 0 | 50 | 50 | 0 |
| Preparation Example 2 | 60 | 40 | 0 | 50 | 50 | 0 |
| Preparation Example 3 | 90 | 10 | 0 | 50 | 50 | 0 |
| Preparation Example 4 | 95 | 5 | 0 | 50 | 50 | 0 |
| Preparation Example 5 | 70 | 25 | 5 | 50 | 50 | 0 |
| Preparation Example 6 | 70 | 30 | 0 | 35 | 65 | 0 |
| Preparation Example 7 | 70 | 30 | 0 | 70 | 30 | 0 |

TABLE 1-continued

| Classification | Acid Component (mol %) | | | Diol Component (mol %) | | |
| --- | --- | --- | --- | --- | --- | --- |
| | TPA | IPA | DA | EG | NPG | BEPD |
| Preparation Example 8 | 70 | 30 | 0 | 50 | 0 | 50 |
| Preparation Example 9 | 70 | 30 | 0 | 70 | 0 | 30 |
| Preparation Example 10 | 70 | 30 | 0 | 35 | 0 | 65 |

* DA: Dodecandioic acid
* BEPD: 2-Butyl-2-ethyl-1,3-propandiol

Experimental Example 1: Evaluation of Physical Properties of Polymer Resins

The physical properties of the polymer resins according to Preparation Examples 1, 8 and 9 and Comparative Preparation Examples 1 and 2 above were evaluated as follows.
1) Glass Transition Temperature ($T_g$)
The glass transition temperature was measured by using a differential scanning calorimeter (DSC), and it was measured by setting the temperature increase rate to 20° C./min. The results are shown in Table 2 below.
2) Weight Average Molecular Weight ($M_w$)
The weight average molecular weight was measured by using gel permeation chromatography (GPC), and it was measured with polymethylmethacrylate as a standard. The results are shown in Table 2 below.
3) Solubility at Room Temperature
The polymer resin was dissolved in a dimethylformamide solvent at a concentration of 22% by weight at 25° C. to observe whether the resin was completely dissolved. The case where the resin was completely dissolved and transparent was indicated by ○, and the case where the undissolved resin remained or was opaque was indicated by X. The measurement results are shown in Table 2 below.
4) Determination of Molar Ratio Between Carbon Atoms and Oxygen Atoms
The molar ratios ($N_C/N_O$) between carbon atoms and oxygen atoms in the polymer resins according to Preparation Examples 1, 8 and 9 and Comparative Preparation Examples 1 and 2 were measured by using FT-NMR. The results are shown in Table 2, respectively.

TABLE 2

| Classification | $N_C/N_O$ | Tg (° C.) | $M_W$ (g/mol) | Solubility at Room Temperature |
| --- | --- | --- | --- | --- |
| Preparation Example 1 | 2.9 | 71.7 | 23,000 | ○ |
| Preparation Example 8 | 3.2 | 67.0 | 8,300 | ○ |
| Preparation Example 9 | 3.0 | 62.7 | 25,000 | ○ |
| Comparative Preparation Example 1 | 6.7 | 191.0 | 12,000 | ○ |
| Comparative Preparation Example 2 | 2.5 | 75.7 | 100,000 | X |

Referring to Table 2, it was found that all of the copolymerized polyester resins according to the present invention had high glass transition temperatures of 60° C. or higher, and also had excellent solubility at room temperature in solvents.

On the other hand, in Comparative Preparation Example 2, which is a commercial polyethylene terephthalate resin, the molar ratio between carbon atoms and oxygen atoms was too low, and thus, it could be predicted that the affinity for the organic solvent would be low, and the solubility in DMF at room temperature was low such that that it could be confirmed from experiments that it hardly melted.

In addition, it was found that Comparative Preparation Example 1, which is a commercial polysulfone-based polymer resin, exhibited an excessively high $N_C/N_O$ value, which is the molar ratio between carbon atoms and oxygen atoms.

Examples 1 to 13 and Comparative Examples 1 and 2

Composition solutions for forming an ultrafiltration membrane were prepared by dissolving the copolymerized polyester resins prepared in the preparation examples in dimethylformamide (DMF), which is a polar aprotic organic solvent, at the concentrations shown in Table 3 below.

Each of the above solutions was dissolved at room temperature (25° C.).

Each of the prepared composition solutions was cast to a thickness of about 150 μm on a polyester nonwoven fabric having a thickness of 90 μm, and after it was immersed in distilled water at 18 C. for phase change and washed with water sufficiently to replace the solvent and water, a porous reverse osmosis membrane in which the composition for forming an ultrafiltration membrane was cast was prepared. FIGS. 1 to 3 are images obtained by photographing the surface and cross-section of the reverse osmosis membrane prepared according to Example 1 by a scanning electron microscope (SEM), respectively.

Experimental Example 2: Measurements of Viscosity of Composition for Forming Ultrafiltration Membrane and Water Permeability of Reverse Osmosis Membrane Coated with Ultrafiltration Membrane The coating compositions for forming an ultrafiltration membrane prepared in Examples 1 to 13 and the reverse osmosis membranes prepared by coating the same were measured for physical properties and performance through the following experimental methods, respectively, and the results are shown in Table 3 below.
1) Method of Measuring Viscosity of Composition Solution
The coating composition solutions for forming an ultrafiltration membrane according to the examples and comparative examples were measured for the viscosity of the coating solutions under a condition of 25° C. using a B-type rotational viscometer (manufactured by Brookfield, Rotor No. LV-3, 100 rpm), respectively.
2) Method of Measuring Water Permeability of Reverse Osmosis Membrane
For the porous reverse osmosis membranes on which the compositions for forming an ultrafiltration membrane according to the examples and comparative examples were cast, the water permeability was measured by operating at a temperature of 25° C. and a pressure of 1 kgf/cm² by using raw water, which is deionized water (DI).

TABLE 3

| Classification | Polymer | Solvent | Concentration (% by weight) | Solution Viscosity (cP) | Water Permeability (gfd) |
|---|---|---|---|---|---|
| Example 1 | Preparation Example 1 | DMF | 14 | 40 | 256 |
| Example 2 | Preparation Example 1 | DMF | 16 | 68 | 207 |
| Example 3 | Preparation Example 1 | DMF | 18 | 116 | 52 |
| Example 4 | Preparation Example 1 | DMF | 20 | 176 | 31 |
| Example 5 | Preparation Example 1 | DMF | 22 | 288 | 18 |
| Example 6 | Preparation Example 1 | DMF | 24 | 452 | 10 |
| Example 7 | Preparation Example 8 | DMF | 20 | 151 | 30 |
| Example 8 | Preparation Example 9 | DMF | 14 | 34 | 243 |
| Example 9 | Preparation Example 9 | DMF | 16 | 68 | 200 |
| Example 10 | Preparation Example 9 | DMF | 18 | 92 | 29 |
| Example 11 | Preparation Example 9 | DMF | 20 | 140 | 29 |
| Example 12 | Preparation Example 9 | DMF | 22 | 232 | 15 |
| Example 13 | Preparation Example 9 | DMF | 24 | 348 | 11 |
| Comparative Example 1 | Comparative Preparation Example 1 | DMF | 18 | 666 | 281 |
| Comparative Example 2 | Comparative Preparation Example 2 | DMF | Not dissolved | Not dissolved | — |

Referring to Table 3, in the reverse osmosis membranes including the ultrafiltration membranes prepared including the copolymerized polyester resins of the present invention according to Examples 1 to 13, it was found that the viscosity was increased and the water permeability was changed according to the concentration of the copolymerized polyester resin in the solution. In particular, it was confirmed that the higher the concentration of the polyester resin, the lower the water permeability, and considering the mechanical durability, membrane contamination resistance and water permeability, it was found that the most appropriate physical properties could be obtained when the concentration was 14 to 16% by weight.

In addition, in Comparative Example 1, an ultrafiltration membrane was formed by using a polysulfone-based polymer, and it was found that the solubility in organic solvents was also excellent. However, polysulfone-based polymers have a high affinity for hydrophobic organic materials, which causes membrane contamination problems during long-term use, and there was disadvantage in that the water permeability was low.

In Comparative Example 2, an attempt was made to form an ultrafiltration membrane with a commercial polyethylene terephthalate resin, but the solubility in an organic solvent was too low to manufacture the ultrafiltration membrane at room temperature.

INDUSTRIAL APPLICABILITY

The present invention relates to an organic solvent-soluble copolymerized polyester, a composition for forming an ultrafiltration membrane including the same, and a high water-permeability reverse osmosis membrane prepared therefrom. More specifically, the present invention relates to a polyester that has a high solubility in organic solvents at room temperature and thus can be used to produce ultrafiltration membranes at low cost, a composition for forming an ultrafiltration membrane including the same, and a high water-permeability reverse osmosis membrane prepared therefrom, wherein the reverse osmosis membrane has a reduced production cost and high water permeability.

The invention claimed is:

1. A composition for forming an ultrafiltration membrane, comprising:
   an organic solvent; and
   a copolymerized polyester that is dissolved in the organic solvent, the copolymerized polyester being formed by an esterification reaction between an acid component comprising at least one $C_{8-12}$ aromatic dicarboxylic acid and a diol component consisting of ethylene glycol and neopentyl alcohol,
   wherein the molar ratio ($N_C/N_O$) of the number of carbon atoms ($N_C$) and the number of oxygen atoms ($N_O$) in the copolymerized polyester is 2.8 to 3.2, and the solubility of the copolymerized polyester in dimethylformamide (DMF) at room temperature is 20% by weight or more, and
   wherein the viscosity of said composition is 10 to 600 cP.

2. The composition of claim 1, wherein the organic solvent comprises at least one solvent selected from the group consisting of diethylene glycol, triethylene glycol, methyl ethyl ketone, ethylene glycol diacetate, ethylene glycol dimethylether, toluene, dimethylformamide, dimethylacetamide (DMAc), N-methyl-2-pyrrolidone (NMP), dimethyl sulfoxide (DMSO), m-cresol, diglycolamine and tetrahydrofuran (THF).

3. The composition of claim 1, wherein the composition comprises the copolymerized polyester at a concentration of 10 to 30% by weight.

4. A reverse osmosis membrane, comprising:
   a porous support layer; and
   an ultrafiltration membrane formed on one surface of the porous support layer, wherein the ultrafiltration membrane comprises a copolymerized polyester that is dissolved in an organic solvent and that is formed by an esterification reaction between an acid component comprising at least one $C_{8-12}$ aromatic dicarboxylic acid and a diol component consisting of ethylene glycol and neopentyl alcohol,
   wherein the molar ratio ($N_C/N_O$) of the number of carbon atoms ($N_C$) and the number of oxygen atoms ($N_O$) in the copolymerized polyester is 2.8 to 3.2, and the solubility of the copolymerized polyester in dimethylformamide (DMF) at room temperature is 20% by weight or more, and
   wherein the reverse osmosis membrane has a water permeability of 200 to 1,000 gfd as measured according to the measurement conditions below:
   the reverse osmosis membrane when operated at a temperature of 25° C. and a pressure of 1 kgf/cm² using raw water, which is deionized water (DI), to measure the water permeability.

5. The reverse osmosis membrane of claim 4, wherein the ultrafiltration membrane has an asymmetric structure in which the average pore size gradually increases or decreases from a surface (lower surface) in contact with the porous support layer to the opposite surface (upper surface), and the average pore size ($D_{50}$) on the upper surface of the ultrafiltration membrane is 0.01 to 0.2 μm.

6. The reverse osmosis membrane of claim 4, further comprising a polyamide coating layer on the ultrafiltration membrane.

7. The reverse osmosis membrane of claim 4, wherein the porous support is a woven fabric or a nonwoven fabric.

8. The composition of claim 1, wherein the acid component comprises terephthalic acid and a $C_{8-12}$ aromatic dicarboxylic acid compound other than terephthalic acid.

9. The composition of claim 8, wherein the $C_{8-12}$ aromatic dicarboxylic acid compound other than terephthalic acid is at least one compound selected from the group consisting of isophthalic acid (IPA), naphthalendioic acid and a 5-sulfoisophthalic acid (SIA) sodium salt, and wherein the acid component comprises 5 to 50 mol % of the $C_{8-12}$ aromatic dicarboxylic acid compound other than terephthalic acid based on the total amount of the acid component.

10. The composition of claim 1, wherein the diol component comprises 35 to 65 mol % of ethylene glycol based on the total amount of the diol component.

* * * * *